United States Patent
Thompson et al.

(10) Patent No.: US 8,223,792 B2
(45) Date of Patent: Jul. 17, 2012

(54) ULTRA LOW COST ETHERNET ARCHITECTURE

(75) Inventors: Geoffrey O. Thompson, Mountain View, CA (US); Robert Muir, East Kilbride (GB); Steven B. Carlson, Portland, OR (US)

(73) Assignee: Rockstar Bidco, LP, New York, NY (US)

( * ) Notice: Subject to any disclaimer, the term of this patent is extended or adjusted under 35 U.S.C. 154(b) by 586 days.

(21) Appl. No.: 10/891,172

(22) Filed: Jul. 14, 2004

(65) Prior Publication Data

US 2005/0078700 A1    Apr. 14, 2005

Related U.S. Application Data

(60) Provisional application No. 60/486,999, filed on Jul. 14, 2003.

(51) Int. Cl.
*H04L 12/66* (2006.01)

(52) U.S. Cl. ......... 370/463; 370/359; 370/419; 370/338

(58) Field of Classification Search .................. 455/3.01, 455/3.06, 400–402; 370/463, 359, 419, 431, 370/338
See application file for complete search history.

(56) References Cited

U.S. PATENT DOCUMENTS

| | | | | |
|---|---|---|---|---|
| 5,994,998 | A * | 11/1999 | Fisher et al. | 375/258 |
| 6,018,447 | A * | 1/2000 | Hannah et al. | 361/42 |
| 6,448,899 | B1 * | 9/2002 | Thompson | 340/815.4 |
| 6,470,053 | B1 * | 10/2002 | Liu | 375/257 |
| 6,535,983 | B1 * | 3/2003 | McCormack et al. | 713/310 |
| 7,046,983 | B2 * | 5/2006 | Elkayam et al. | 455/402 |
| 7,453,895 | B2 * | 11/2008 | Binder | 370/401 |
| 7,715,534 | B2 * | 5/2010 | Binder | 379/90.01 |
| 2004/0105467 | A1 * | 6/2004 | Goodman | 370/910 |
| 2004/0239512 | A1 * | 12/2004 | Lomax et al. | 340/638 |
| 2006/0056444 | A1 * | 3/2006 | Binder | 370/463 |

* cited by examiner

*Primary Examiner* — Kamran Afshar
*Assistant Examiner* — Dung Lam
(74) *Attorney, Agent, or Firm* — Withrow & Terranova PLLC

(57) ABSTRACT

A low cost mechanism that may be used to extend Ethernet capability to low end devices provides sufficient capacity to support Ethernet communications using only a single twisted pair medium. Because only a single twisted pair is used, the overall cost, complexity and size associated with the integrating Ethernet functionality into an end device is reduced. A distributed power system delivers power to a Data Terminal Equipment (DTE) device over the single twisted pair medium. With such an arrangement, Ethernet capability and power may be simultaneously delivered to low end devices at a reduced cost.

2 Claims, 3 Drawing Sheets

ULTRA LOW COST ETHERNET ARCHITECTURE

RELATED APPLICATIONS

This application claims priority to previously filed U.S. Provisional application Ser. No. 60/486,999 filed Jul. 14, 2003, and entitled "Ultra Low Cost Ethernet Architecture".

FIELD OF THE INVENTION

This invention relates generally to the field of networking and more particularly to a low cost communication method and apparatus.

BACKGROUND OF THE INVENTION

Ethernet (IEEE Std 802.3) and especially twisted-pair Ethernet (10BASE-T, 100BASE-TX & 1000BASE-T has become the ubiquitous means for connecting to data communication networks. Because Ethernet interfaces have historically been expensive, it has not been previously desirable to add Ethernet functionality to low margin products. However, in accordance with Moore's law, the costs and power consumption associated with connecting a device, such as a Data Terminal Equipment (DTE) end station, to a network has been dropping rapidly. As a result, an increasing variety of DTE's are being made available to a consumer.

Traditionally network devices, such as IP phones, wireless LAN access points, laptop computers and Web cameras, which desire to connect to a network, have required both AC and LAN connectors. As the number and types of LAN devices available in corporations has increased, providing wiring for both AC and LAN connections to support the devices has become a costly task.

A design standard that has been introduced to overcome the problem is specified in IEEE Std 802.3af, commonly known as the "Power Over Ethernet" (PoE) standard. This standard provides an integrated power and data network connection so that devices with only modest power requirements (<12 watts) can get/draw power and communicate LAN data over the same connection. Such an arrangement removes the need for independent power and LAN connections for each DTE device by enabling DTEs that are 802.3af compliant to receive data and power from 802.3af compliant Ethernet Media Access Units (MAUs). This, in turn, ultimately lowers the cost of attaching a device to the LAN.

Thus the 802.3af solution has provided a way to simultaneously satisfy the power and Ethernet communication needs of the low end devices. However, it still requires a certain amount of overhead, in terms of power supply, connector circuitry and cabling. The overhead associated with 802.3af connectivity reduces its potential as a network solution for distributed low cost, low end devices.

SUMMARY OF THE INVENTION

It is an object of the present invention to further reduce the costs associated with coupling lower end devices (i.e., those with low/modest computational and power requirements) to a communications network, and thereby expand the market for such devices. For example, low end devices that may be assisted by the present invention include light switches, thermostats, remote control repeaters, audio/video equipment controls, low duty cycle actuators, simple wired sensors and indicators and other devices characterized by modest computational requirements. One application of the present invention is in the building automation market, which is quite cost sensitive, especially in residential applications. As will be described in more detail herein, a combination of several features enables building air conditioning "AC" control by Ethernet at a cost level that is at least as low as that of traditional AC control for new construction, even in a residential environment. The prospect of network/remote control/monitoring in new construction and in building renovation projects is expected to drive the market for the number of Ethernet ports to a new higher level.

According to one aspect of the invention, a device comprises an interface to a communication link, the communication link comprising a single pair of conductors enabling Ethernet communication by the device with a Data Terminal Equipment (DTE) device, the interface including means for providing power to the DTE over the single pair of conductors.

According to another aspect of the invention, a receiving Data Terminal Equipment (DTE) device includes an interface to a communication link, the communication link comprising a single pair of conductors from receiving communications from an Ethernet transceiver, the receiving DTE including means for powering the DTE in response to a current on the pair of conductors.

A communication link comprising a single pair of conductors, for providing half-duplex Ethernet communication between a hub and Data Terminal Equipment (DTE), and for delivering a current from a power source in the hub to the DTE for the purposes of powering the DTE.

A low cost Ethernet network includes an Ethernet hub or switch coupled to a Data Terminal Equipment (DTE) device by a single pair of conductors, wherein the hub and DTE exchange Ethernet communications to the DTE on the single pair of conductors, and wherein the hub further comprises power source equipment providing a current for powering the DTE. With such an arrangement, a low cost Ethernet connection provides control and power to a remote DTE.

DETAILED DESCRIPTION

Figure 1:
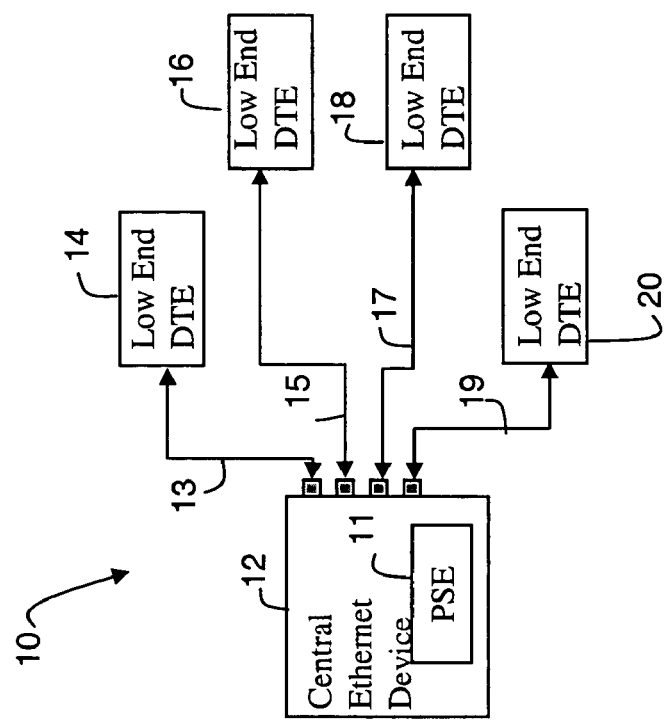
FIG. 1 illustrates an exemplary network in which the present invention may be implemented.

Referring now to FIG. 1, an Ultra Low Cost Ethernet (UCLE) network 10 is shown to include a number of low end Data Terminal Equipment (DTE) devices 14, 16, 18 and 20 coupled to an Ethernet device 12, which may be a Switch, Hub/Repeater or any other type of device capable of transmitting an Ethernet signal. Connection between the Ethernet device 12 and DTEs 14, 16, 18 and 20 is provided via respective communication links 13, 15, 17 and 19. According to one aspect of the invention, each of the communication links 13, 15, 17 and 19 consists of a single pair of conductors. In one embodiment, the single pair of conductors are twisted pair cable; a type of cable that consists of two independently insulated copper wires twisted around one another. The use of twisted wires helps to reduce crosstalk and electromagnetic induction at higher frequencies used for Ethernet communications. According to one aspect of the invention, the Ethernet device 12 includes power sourcing equipment (PSE) 11 which provides AC current to the pair of conductors for the purposes of powering the attached DTE via its included AC/DC converter.

The present invention's use of a single twisted pair communication link for Ethernet communication differs significantly from existing Ethernet networks, which generally use Cat 3 or Cat 5 cable. Both Cat 3 and Cat 5 cable include four sets of twisted pair conductors. Such cabling aids Ethernet systems seeking to achieve 100 M/bit performance, however, much of the cable capacity can be unused in lower performance applications. For example, current standardized implementations of Ethernet use an 8 pin modular connector (IEC 60603-7) This connector is not particularly well suited for automatic termination to controlled impedance cable, because of near-end cross-talk ("NEXT"). NEXT problems arise because of the standardized pin to pair assignments (1-2,3-6, 4-5,7-8). In addition, in applications such 10BASE-T media system, or Power over Ethernet systems, only two pairs of wires are used, both of which are terminated in an eight-pin (RJ-45 style) connector. This means that four pins of the eight-pin MDI connector are unused. The present invention uses the minimum number of conductors possible for Ethernet operation, and thereby removes significant costs by reducing the amount of copper, insulation material and connecting hardware termination points.

In one embodiment, a new connector including only two pins (for each pin of the communication link) would be provided for insertion in a wall jack or the like coupled to the Ethernet transceiver. In addition, other embodiments envision that a significant portion of the stations terminated would be permanently terminated rather than terminated in a disconnectable plug and jack configuration. Such an arrangement could be achieved as "punch-downs" in wiring panel termination situations and permanent end devices or other termination methods.

The twisted pair communication link is capable of 10 Mb/s operation; the well established minimum operating speed that is considered to be "real Ethernet". Historically the size and complexity of hardware necessary to support this rate of operation made it unfeasible to incorporate Ethernet functionality in low cost devices. However, in accordance with Moore's law, the number of transistors that fit on a chip has continued to approximately double on a yearly basis. As a result, the size and cost of the silicon needed to support Ethernet communication has decreased to a point that makes it feasible to attach low cost, low end devices to the Ethernet.

In particular, according to one embodiment, a 'low end' device may be any device that one may want to remotely control in a residence or commercial space. Such low end devices include light switches, thermostats, remote control repeaters, audio/video equipment controls, low duty cycle actuators, simple wired sensors and indicators and other such devices. The network 10 of the present invention may be provided within the residence or commercial space for the purposes of controlling any low end device in the space. The provision of power as well as data to the individual DTEs reduces the overall wiring that need be provided within the structure.

Communication between the Ethernet device 12 and the DTE's may be either full-duplex, in one embodiment or half-duplex in an alternate embodiment using Carrier Sense Multiple Access with Collision Detection (CSMA/CD). Half-duplex communication may be preferable if it is desirable to minimize the transistor count of the attachment devices.

Figure 2:
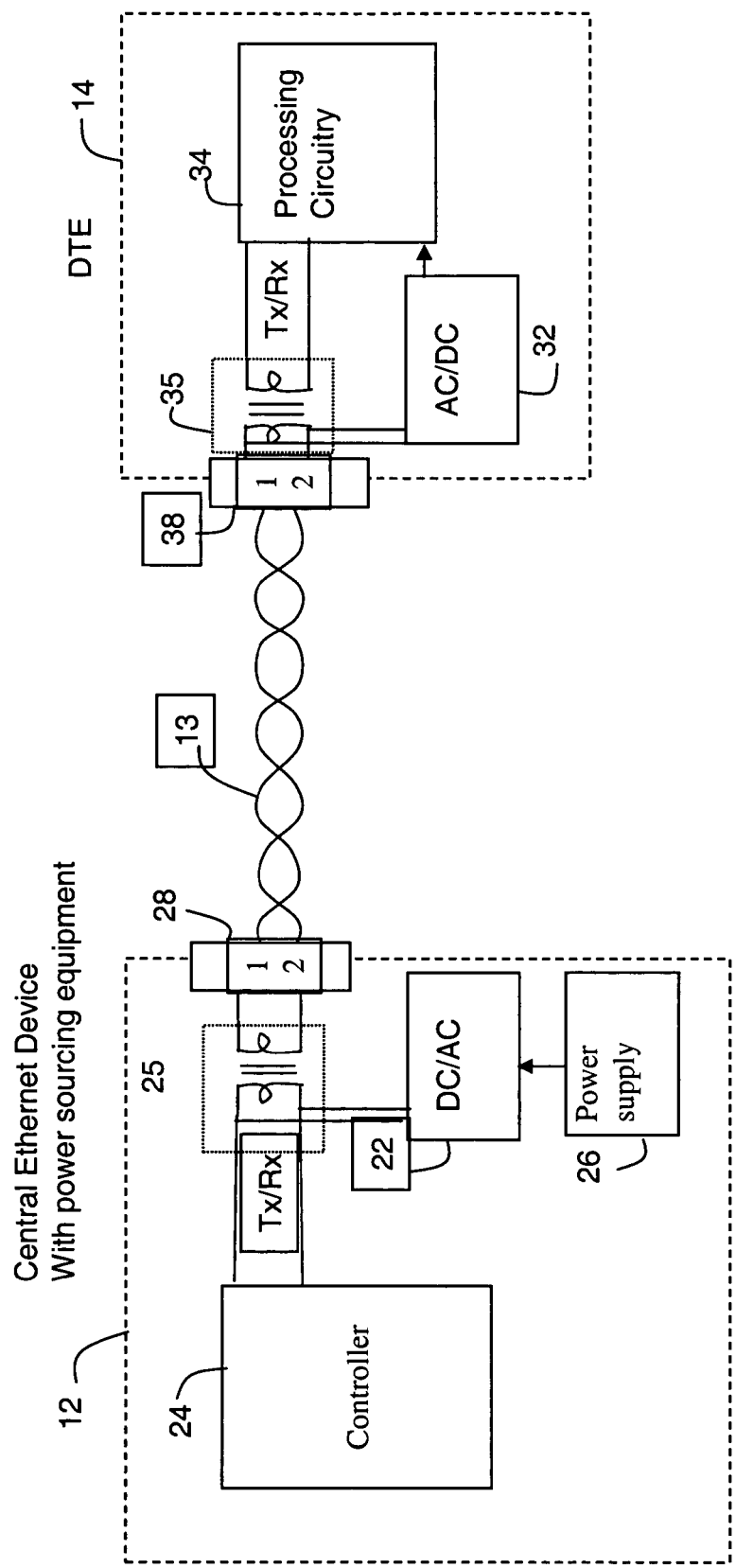
FIG. 2 is a block diagram illustrating exemplary components that may be included in an Ethernet device and Data Terminal Equipment (DTE) using the present invention.

Referring now to FIG. 2, a block diagram of exemplary components that may be included in an Ethernet transceiver portion of Ethernet transmission device 12 and the DTE are shown. It should be noted that the block diagram is provided for illustrative purposes only, and other devices capable of providing the functionality described below may be substituted herein.

Communication signals are exchanged between the controller 25 and an isolation transformer 26. (An isolation transformer 36 is also provided in the DTE). According to one aspect of the invention, the isolation transformers 26 and 36 are single coil transformers. One of the most attractive features (from a safety standpoint) of twisted pair Ethernet has been the galvanic isolation that is provided by the isolation transformer (26, 36) at each end of every twisted pair Ethernet Link Segment. Unfortunately, this feature has been one that has been more highly resistant to cost reduction over the years than other aspects of Ethernet implementation technology. However, because the present invention reduces the cabling requirement to a single pair, the complexity of isolation is concomitantly reduced, potentially by as much as 50%. In addition to cost reduction, this also reduces the amount of circuit board space required for each port in a hub or switch.

Although IEEE Std 802.3af provided the capability to include power in the data connection, it did not effectively minimize cost of such a connection. According to one embodiment of the present invention, the cost of providing power is minimized by distributing a single power supply across the transceiver/DTE pair. One advantage of using AC to transmit the power is that it permits each half of the power supply to be coupled to the equipment side of the transformer at its end, thus maintaining the full isolation feature of 10BASE-T.

Power is provided to the twisted pair via power supply 26 and DC/AC converter 22. The DC/AC converter may include transistors to convert the DC signal from the power supply to a square wave AC, which is run though transformer 26. In one embodiment, a high frequency AC signal is generated, which increases the efficiency and reduces the size of the transformer.

At the DTE, the AC/DC converter 32 rectifies the new voltage of AC from the output side of the transformer 35. The received voltage is used to power the processing logic of the DTE. In one embodiment of the invention, the maximum power delivered to a DTE is relatively low, for example in the 1 to 2 watt level. Such a power level is sufficient to power many low end devices. It should be noted, however, that the present invention is not limited to the delivery of any specific power level and may be easily adapted by one of skill in the art to provide the appropriate power level for any desired device with low computational requirements. One advantage of providing a lower power is that it lessens any safety and/or regulatory concerns and reduces the withstand energy requirements of the front end of the chip.

In one embodiment of the invention, the end device packaging for a DTE that is used in the present invention is expected to fit easily in a plastic outlet box that will be sized to match the traditional NEMA duplex or simplex outlet enclosure (or its metric equivalent). In one embodiment, the enclosure has the traditional switch "look and feel", although this is expected to evolve to greater functionality in the same size enclosure.

Figure 3:
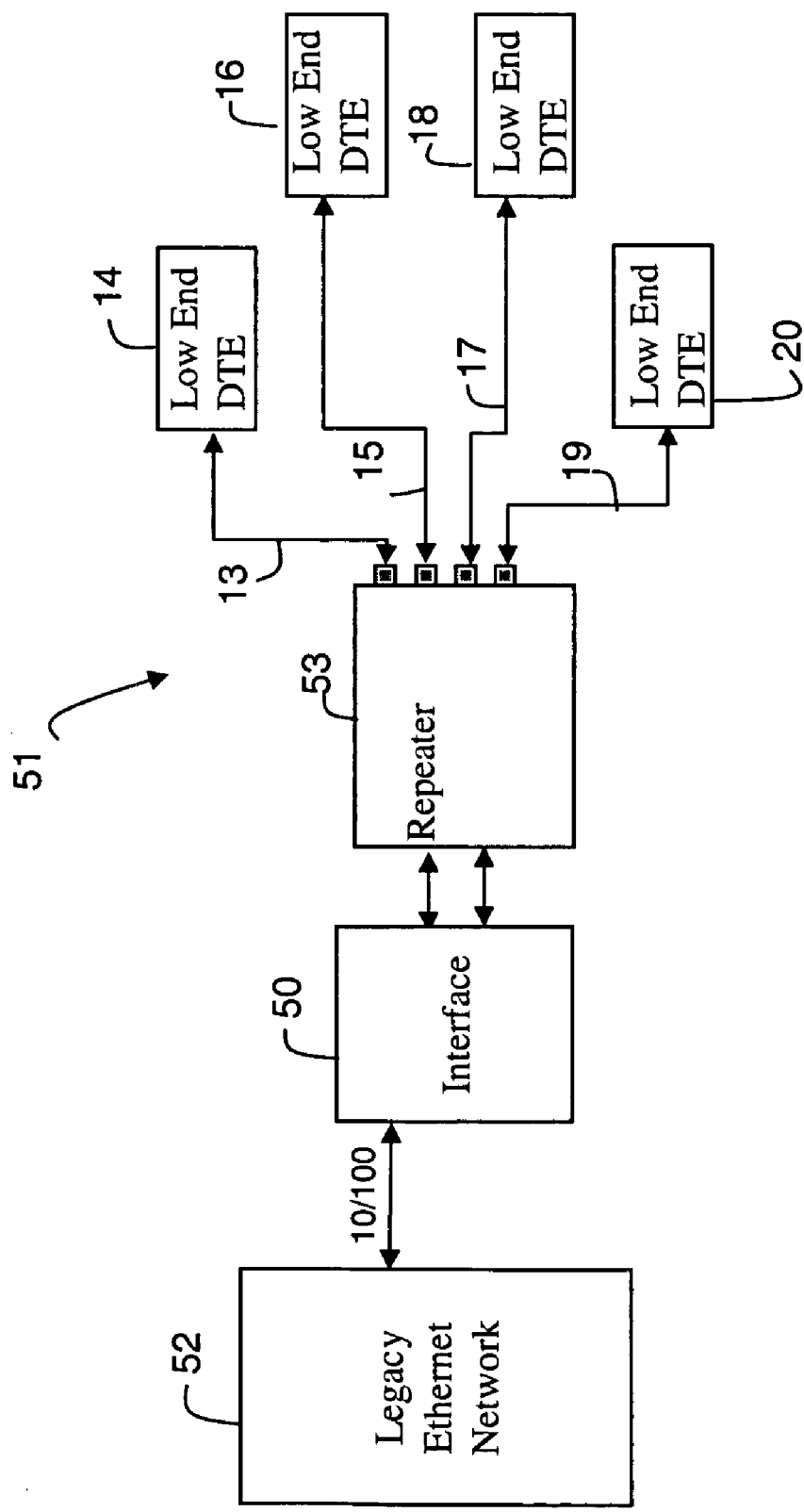
FIG. 3 is a block diagram illustrating the integration of the present invention into a legacy (e.g. IEEE 802.3) Ethernet network.

Although the above description has focused only on the single twisted pair communication medium, it will be appreciated that similar network functionality may be provided using legacy Ethernet constructs, such as using IEEE standard 802.3. For example, referring now to FIG. 3, one method by which an Ultra Low Cost Ethernet network 51 may be incorporated into an existing Ethernet network 52 is shown. A low cost interface device 50 is provided between ULCE 51 and a legacy based core network 52. This interface device is capable of providing 10/100 connection to the core and a 2 port non-filtering bridge to a 10 Mb/s repeater 53 that provides the ULCE connectivity via punch-downs directly mounted on a motherboard. With such an arrangement, ULCE compatible devices may be controlled using legacy Ethernet devices.

Accordingly, a low cost mechanism that may be used to extend Ethernet capability to low end devices has been shown and described. The low cost mechanism provides sufficient capacity to support Ethernet communications using only a single twisted pair medium. Because only a single twisted pair is used, the overall cost, complexity and size associated with the integrated Ethernet functionality is reduced. A distributed power system delivers power to a Data Terminal Equipment (DTE) device over the single twisted pair medium. With such an arrangement, Ethernet capability and power may be simultaneously delivered to low end devices at a reduced cost.

The above description and figures have included various process steps and components that are illustrative of operations and functions that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A transceiver comprising: an interface to a communication link, the interface comprising only two pins for coupling to the communication link, the communication link comprising only a single twisted pair of conductors enabling Ethernet communication with a receiving Data Terminal Equipment (DTE) device, the interface including a power supply for providing alternating current (AC) power to the DTE over the single twisted pair of conductors, and a transformer for receiving Ethernet data signals and for providing the Ethernet data signals over the single twisted pair of conductors.

2. The transceiver of claim 1 wherein the transformer is a single coil isolation transformer.

* * * * *